US011598945B2

United States Patent
Lange et al.

(10) Patent No.: US 11,598,945 B2
(45) Date of Patent: Mar. 7, 2023

(54) ADAPTER FOR USE WITH A SAMPLE HOLDER, AND METHOD FOR ARRANGING A SAMPLE IN A DETECTION BEAM PATH OF A MICROSCOPE

(71) Applicant: Carl Zeiss Microscopy GmbH, Jena (DE)

(72) Inventors: Ralph Lange, Jena (DE); Rebecca Elsässer, Jena (DE); Harald Schadwinkel, Hannover (DE); Emmanuel G. Reynaud, Blackrock (IE)

(73) Assignee: Carl Zeiss Microscopy GmbH, Jena (DE)

( * ) Notice: Subject to any disclaimer, the term of this patent is extended or adjusted under 35 U.S.C. 154(b) by 327 days.

(21) Appl. No.: 16/624,069

(22) PCT Filed: Jun. 28, 2018

(86) PCT No.: PCT/EP2018/067381
§ 371 (c)(1),
(2) Date: Dec. 18, 2019

(87) PCT Pub. No.: WO2019/011658
PCT Pub. Date: Jan. 17, 2019

(65) Prior Publication Data
US 2021/0149171 A1 May 20, 2021

(30) Foreign Application Priority Data
Jul. 11, 2017 (DE) .................... 10 2017 006 884.4

(51) Int. Cl.
*G02B 21/26* (2006.01)
*G02B 21/00* (2006.01)
(Continued)

(52) U.S. Cl.
CPC ............ *G02B 21/26* (2013.01); *G01N 21/13* (2013.01); *G02B 21/34* (2013.01)

(58) Field of Classification Search
CPC ........ G02B 21/00; G02B 21/24; G02B 21/26; G02B 21/32; G02B 21/34; G01N 21/13
(Continued)

(56) References Cited

U.S. PATENT DOCUMENTS 6,411,434 B1 * 6/2002 Eastman ................ G02B 21/34
359/398
8,482,854 B2 7/2013 Lippert et al.
(Continued)

FOREIGN PATENT DOCUMENTS

DE 10 2007 015 061 10/2018
JP 2002-110078 * 4/2002
(Continued)

OTHER PUBLICATIONS

International Search Report dated Oct. 8, 2018 in PCT/EP2018/067381 with English translation, 5 pages.
(Continued)

*Primary Examiner* — Thong Q Nguyen
(74) *Attorney, Agent, or Firm* — Grüneberg and Myers, PLLC

(57) ABSTRACT

An adapter is useful with a sample holder of a microscope. The adapter has at least one support region for reproducibly orienting the adapter in a mounted state in a sample holder support. The adapter also has a first coupling point for detachable connection to a coupling structure of a sample holder on one side, and a second coupling point for detachable connection to a coupling structure of a sample manipulator on a side of the adapter opposite to the first coupling point. The adapter is useful with the sample holder, a sample
(Continued)

chamber, a microscope and a method for arranging a sample in a detection beam path of a microscope.

14 Claims, 14 Drawing Sheets

(51) Int. Cl.
    *G01N 21/13*     (2006.01)
    *G02B 21/34*     (2006.01)
(58) Field of Classification Search
    USPC .......................................... 359/368, 391–398
    See application file for complete search history.

(56) References Cited

U.S. PATENT DOCUMENTS

| | | | |
|---|---|---|---|
| 8,699,133 B2* | 4/2014 | Lippert | G02B 21/26 359/398 |
| 8,999,273 B2* | 4/2015 | Goodman | H01J 37/20 422/549 |
| 9,733,160 B2* | 8/2017 | Hellmich | G02B 21/32 |
| 9,816,916 B2 | 11/2017 | Pampaloni et al. | |
| 2002/0005492 A1 | 1/2002 | Hashikawa et al. | |
| 2010/0067104 A1 | 3/2010 | Lippert et al. | |
| 2015/0022807 A1* | 1/2015 | Knott | G02B 21/34 356/244 |
| 2015/0211981 A1 | 7/2015 | Pampaloni et al. | |
| 2015/0338630 A1* | 11/2015 | Joly | G06F 3/0317 359/385 |

FOREIGN PATENT DOCUMENTS

| | | |
|---|---|---|
| WO | 2007/065711 | 6/2007 |
| WO | 2014/033320 | 3/2014 |

OTHER PUBLICATIONS

International Preliminary Report on Patentability, and English translation of Written Opinion dated Oct. 8, 2018 in PCT/EP2018/067381.

* cited by examiner

ADAPTER FOR USE WITH A SAMPLE HOLDER, AND METHOD FOR ARRANGING A SAMPLE IN A DETECTION BEAM PATH OF A MICROSCOPE

CROSS-REFERENCE TO RELATED APPLICATIONS

This application is a National Stage entry under § 371 of International Application No. PCT/EP2018/067381, filed on Jun. 28, 2018, and which claims the benefit of German Application No. 10 2017 006 884.4, filed on Jul. 11, 2017.

BACKGROUND OF THE INVENTION

Field of the Invention

The invention relates to an option for introducing large samples into a sample space or sample chamber and for observing large samples using a microscope, in particular using a light sheet microscope.

Description of the Art

Modern light sheet microscopes have been developed for examining small samples with a diameter of no more than 5 mm. By way of example, the samples are embedded in a medium, e.g., in agarose, and guided and held in a hollow tube of the sample holder. Together with the sample holder, a sample to be examined is placed directly into the sample chamber by means of a sample manipulator. To this end, the sample holder is fastened to the sample manipulator.

This procedure is not possible, or only possible with much outlay, for large samples and it is often linked with the risk of damaging the sample. On account of the dimensions of the sample, the latter can no longer be introduced through an insertion opening of the sample chamber by means of the sample manipulator. Moreover, introducing the sample into the sample chamber from the outside is very complicated for as long as the sample chamber is situated in the microscope.

BRIEF SUMMARY OF THE INVENTION

The invention is based on the object of proposing a possibility that also allows large samples to be observed by means of a microscope, in particular by means of a light sheet microscope.

The object is achieved by virtue of proposing an option for placing the sample into the sample chamber in a predetermined fashion and position. Afterwards, the sample chamber is brought into the microscope. The sample is grasped directly or indirectly and can be manipulated, for example positioned and moved, in accordance with the requirements of the microscopy process. Further embodiments specify advantageous developments.

DETAILED DESCRIPTION OF THE INVENTION

Figure 1:
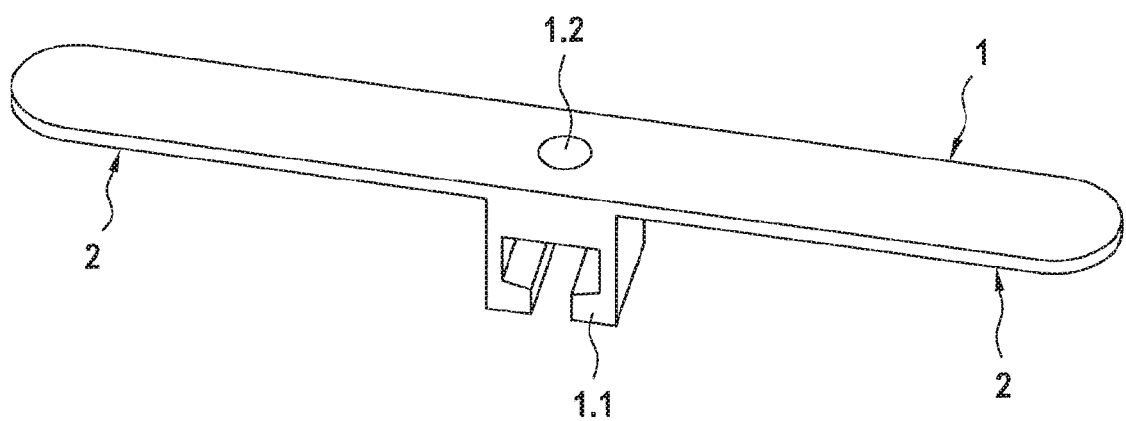
FIG. 1 shows a first exemplary embodiment of a coupling piece or adapter according to the invention.

The core of the invention consists of arranging a sample holder with predefined positioning, i.e., at a predefined location and with a predefined alignment of the sample holder—and hence also of a sample held by means of the sample holder—relative to the sample chamber. Since the sample chamber in turn is arranged or can be arranged with known positioning in relation to an illumination beam path and a detection beam path of a microscope, the sample holder and, where appropriate, the sample are positioned or positionable in a unique manner relative to the illumination beam path and to the detection beam path.

According to the invention, positioning of the sample is achieved by an interaction of a plurality of technical elements that are calibrated to one another. In particular, these technical elements are a coupling piece or adapter with two coupling points, a sample holder with a coupling structure and a sample chamber comprising at least one sample holder support. According to the invention, a manipulation of the sample in respect of its current positioning can be implemented by means of a sample manipulator, which has a coupling structure.

The coupling piece, which is also referred to as an adapter below, comprises at least one support region, which serves for reproducibly orienting the adapter in a mounted state. In the mounted state, the support region is inserted or pushed into a sample holder support of a sample chamber, said sample holder support serving as an adapter receptacle and being embodied accordingly. On a side of the adapter advantageously facing the sample chamber in the mounted state of said adapter, the adapter has been provided with a first coupling point. The latter serves for detachable mechanical connection to a coupling structure of the sample holder.

Furthermore, on a side of the adapter opposite to the first coupling point, the adapter comprises a second coupling point for detachable connection to a coupling structure of the sample manipulator. Therefore, the second coupling point is situated on a side of the adapter advantageously facing away from the sample chamber in the mounted state of said adapter. Said orientations of the coupling points are functionally advantageous. The respective coupling structures may engage around the adapter in at least one region, and so an additional contact with the side of the adapter opposite a respective coupling point is present in the mounted state, in addition to a connection to the first or second coupling point.

The coupling structure of the sample manipulator can be embodied as a gripper, which engages at the second coupling point or releases the latter again. In further embodiments, the coupling structure can also be embodied as an electromagnet and/or as a structure that is functionally compatible with the second coupling point, i.e., corresponding to said second coupling point in respect of its dimensions and form.

In further embodiments of the adapter, the support regions thereof can be provided with positioning elements, desired positioning in the sample holder support being achieved by the effect of said positioning elements. By way of example, such positioning elements are asymmetrically formed and/or asymmetrically arranged elevations and/or depressions, which correspond to correspondingly formed and/or arranged structures of the sample holder support. As an alternative or in addition thereto, the support region or support regions may have forms and dimensions that only allow a predetermined positioning of the adapter in interaction with correspondingly formed and/or arranged sample holder supports.

Each of the support regions may be situated in peripheral fashion at the adapter, which for example has an elongate embodiment, and may have, for example, a plane and/or hardened or coated surface. In order to reduce unwanted play in the plane of the sample holder support, lateral faces and/or end faces of the support regions can be very precisely manufactured, hardened and/or coated.

The support region or the support regions of the adapter may also be embodied in circular fashion or as circular sectors in further embodiments. Then, the second coupling point accordingly has a corresponding embodiment in relation thereto in order to achieve a connection between adapter and sample manipulator that has as little play as possible.

In order to facilitate the desired positioning of the sample holder and the sample, the sample chamber comprises at least one sample holder support. By way of example, this is a groove and/or a differently formed cutout in the sample chamber. In further embodiments, the sample holder support can also be formed by elevations and/or profiling in an edge, in particular the upper edge, of the sample chamber and can be embodied, for example, as counterparts to the positioning elements and/or counterparts of the at least one support region of the adapter.

The sample holder is embodied to receive and hold the sample. By way of example, said sample holder may comprise a sample stage or sample cage, a carrier portion and the coupling structure. In one embodiment, the sample holder comprises a coupling piece, which is preferably shaped so as to fit to the sample holder support. Advantageously, the coupling piece or the adapter is detachably connected to the sample holder. The carrier portion connects the sample stage to the coupling structure. Advantageously, the carrier portion has an offset or bent embodiment and it is only fastened at one side of the sample stage. As a result, a sample situated on the sample stage can be observed from three sides without restriction. Further, it is advantageous if the carrier portion is arranged laterally with respect to the sample stage or at least comprises a vertical slot, through which, for example, an overview image of the sample can be recorded.

A detachable connection is implemented by mechanical means in particular, for example by means of corresponding force-fit or interlocking connections. Detachable within the meaning of the invention also includes connections based on the effect of magnetic fields. The sample chamber according to the invention may be a sample chamber known from the technical field of light sheet microscopy, which has been additionally equipped with at least one sample holder support. By way of example, it comprises a window for radiating in illumination radiation along an illumination beam path. Here, preferably, the illumination radiation is formed into a dynamic or static light sheet, in a manner known per se. The light sheet is formed in the interior of the sample chamber. Advantageously, a further window is present, a detection beam path being able to extend therethrough. Advantageously, the windows facilitate profiles of the illumination beam path and detection beam path at right angles to one another.

The sample chamber may have at least three windows. By way of two opposing windows, the light sheet can be generated by means of two objectives that face one another along the illumination beam path. The detection beam path is directed on the illumination beam path and the generated light sheet through a window arranged perpendicular thereto. Furthermore, the object is achieved by a method for arranging a sample in a detection beam path of a microscope. The method includes the steps of providing a sample chamber according to the invention and of inserting a sample to be observed, which is held on the sample holder, into an interior of the sample chamber. Here, the sample holder is connected by way of its coupling structure to the first coupling point of the adapter. The adapter, with its support region, is mounted in the sample holder support of the sample chamber in detachable fashion. On account of the shapes and dimensions of sample holder support and sample region being fitted to one another, the sample holder and the sample are mounted with predefined positioning.

The adapter is connected to a sample manipulator by means of the second coupling point of the adapter and a coupling structure of the sample manipulator. Then, together with a sample holder and the sample, the adapter is movable by way of the sample manipulator, possibly after removing the adapter from the mounted state, and said adapter is moved into the detection beam path of the microscope and/or relative thereto, for example by carrying out control commands of a control unit.

The sample holder with adapter is equipped with the sample and placed into the sample chamber. A gripper facilitates receiving and attaching the adapter in the sample holder support, preferably in automated fashion. The gripper establishes a connection to the remaining sample manipulator. The gripper is actuatable by means of a gripper drive of the sample manipulator and allows a controlled movement of the sample holder, for example horizontal and/or vertical movements and rotations and/or tilted positioning.

Since the adapter comprises defined interfaces to the sample chamber, to the sample holder and to the gripper or the sample manipulator, sample holders can be used in different variants, depending on the requirement of the sample, without having to modify the other elements of the microscope.

Large samples, i.e., for example, samples with a diameter of more than 5 mm, are introduced into the sample holder and inserted into the sample chamber with the latter. Due to the coupling piece, the position and alignment of the inserted sample holder are predetermined. Here, the sample chamber is advantageously removed, in full or in part, from the position in the microscope at which it should be arranged for the purposes of the observation by means of the microscope.

Subsequently, the sample chamber is inserted into the microscope and the observation process can start.

Here, the gripper grips the coupling piece and lifts the sample holder out of the sample holder support to such an extent that the sample holder can be moved freely. Gripper and sample holder move according to the actuation of the sample manipulator, and so the sample can be placed at a desired observation position, for example a focal plane of a detection optical unit of the microscope. Image stacks of the sample can be captured by a sequential alteration of the current position of the sample holder, said image stacks subsequently being able to be used for three-dimensional imaging of the sample or of the observed sample region.

In an advantageous configuration of the method, a sample is placed on a sample stage of the sample holder. The sample holder is connected to the adapter and inserted into the sample chamber in a loading direction. Here, with its at least one support region, the adapter is inserted into at least one sample holder support of the sample chamber. Here, the carrier portion faces an illumination objective. The sample can only be illuminated by means of the illumination objective if the carrier portion extends outside of the illumination beam path or if said carrier portion comprises an aperture, for example a slot with a vertical extent, in the region of the illumination beam path. An overview image of the sample arranged in the sample chamber in the loading direction can be recorded. In addition or as an alternative thereto, the sample can be illuminated by a light sheet using at least one of the objectives of the illumination beam path. The adapter may have already been contacted by the sample manipulator and be coupled to the latter.

In order to examine the sample according to the method of light sheet microscopy, the adapter is connected to the sample manipulator, should this not yet have taken place, following the recording of an overview image, for example. The drive of the sample manipulator is actuated by means of the control unit and the sample holder is lifted and rotated through 90° in a work direction, for example. In the work direction, the combination of sample holder and adapter is inserted into a sample holder support accordingly present in the sample chamber or said combination is held by the sample manipulator. The sample can be illuminated by a light sheet by means of all illumination objectives and can be observed by means of an objective of the detection beam path when the sample holder is in the work direction. The term work direction also comprises tilting movements, translations and rotations of the sample holder.

The advantage of the method according to the invention is obtained by virtue of it no longer be necessary to insert large samples into a sample chamber that is arranged in the microscope, more particularly the light sheet microscope. Moreover, what is most advantageously ensured is that, following the insertion of the sample chamber into the microscope, the sample holder can be gripped and moved securely and in an automated fashion by the sample manipulator. No additional manual processes are required for connecting the sample holder or adapter and sample manipulator.

A great advantage of the invention further consists of the fact that all device-specific interfaces can be maintained despite a significant expansion in the use options of the microscope.

The invention will be explained in more detail below on the basis of schematic figures and exemplary embodiments.

The drawings are schematic. Identical technical elements are provided with the same reference signs.

A first exemplary embodiment of a coupling piece 1 or adapter 1 according to the invention, illustrated schematically in FIG. 1, comprises an elongate form that is flattened on both sides. At the end regions, support regions 2 are present in each case on one side. These are situated on a side face of the adapter 1 that faces a sample chamber 3 (see FIGS. 2, 8) in a mounted state of the adapter 1. A first coupling point 1.1, configured as a so-called dovetail guide in the exemplary embodiment, is situated on the same side. A second coupling point 1.2 in the form of an aperture is situated on the opposite side face, which faces away from the sample chamber 3 in the mounted state of the adapter 1. The latter can be embodied as a blind hole or as a passage opening. In further embodiments, the second coupling point 1.2 can be embodied, for example, as a dovetail guide, hook, funnel, sphere, etc.

Figure 2:
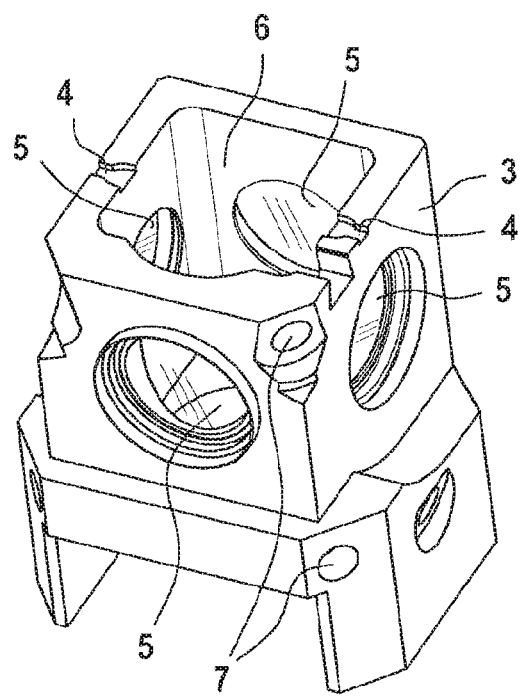
FIG. 2 shows a first exemplary embodiment of a sample chamber according to the invention.

FIG. 2 shows a first exemplary embodiment of a sample chamber 3 according to the invention. At its upper edge, it comprises a sample holder support 4 in the form of respectively one groove or cutout in two mutually opposing walls of the sample chamber 3. The walls of the sample chamber 3 comprise windows 5 and enclose an interior 6 of the sample chamber 3. In order to introduce, for example, a desired medium, for example a culture medium, into the interior 6 or in order to let said medium flow through the interior 6, ports 7 for supply and/or removal are present (see also FIG. 3).

Figure 3:
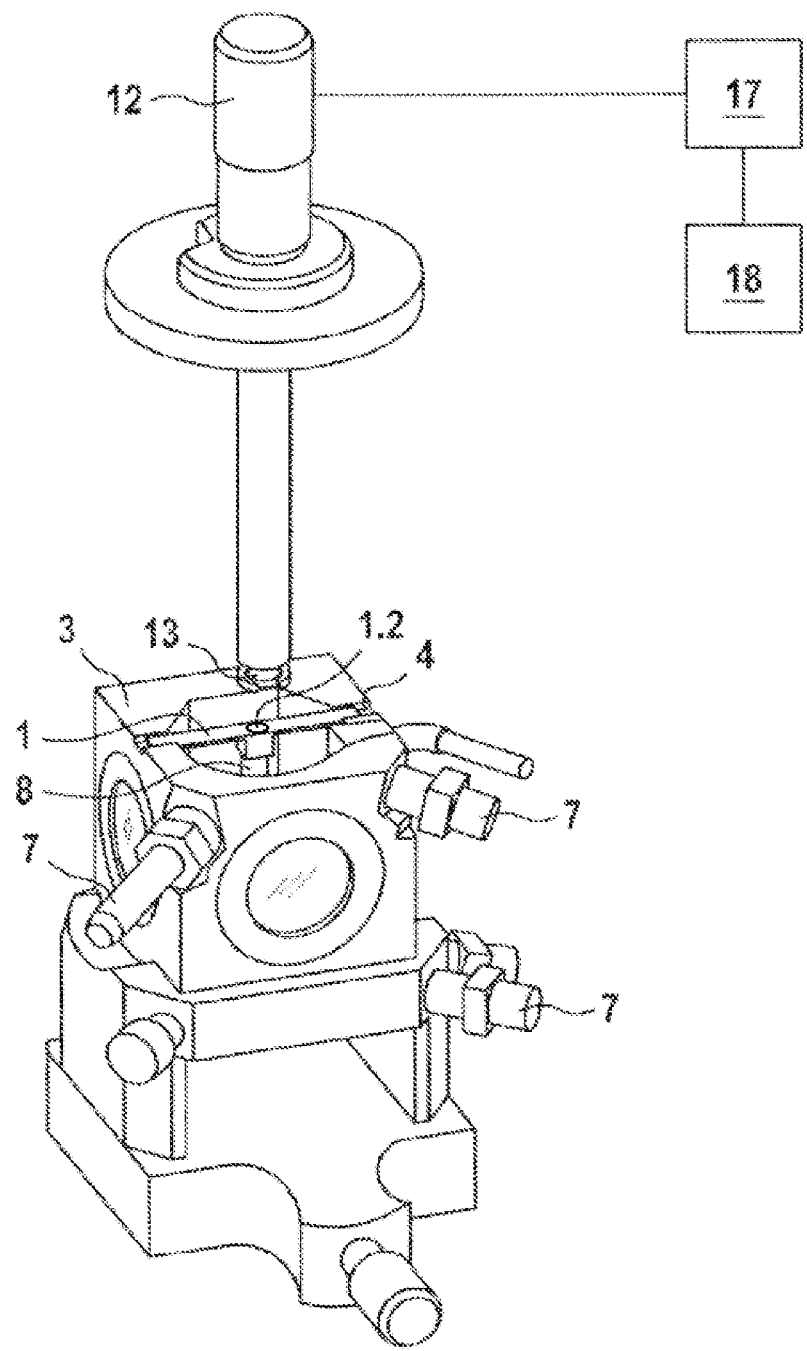
FIG. 3 shows a second exemplary embodiment of a sample chamber according to the invention.

FIG. 3 shows a further embodiment of the sample chamber 3 with viewing windows 5 and ports 7. The upper edge of the sample chamber 3 comprises the sample holder support 4 in the form of a cutout, into which a sample holder 8 with an adapter 1 detachably fastened thereto engages or is able to engage.

Furthermore, a sample manipulator 12 is present with a gripper as a coupling structure 13. The latter serves to grip and hold the sample holder 8. To this end, the sample manipulator 12 is detachably connected to the second coupling point 1.2 of the adapter 1 by means of the coupling structure 13. The sample manipulator 12, more particularly the gripper, is movable in a controlled fashion by means of a drive 17, which in turn has established a connection with a control unit 18, said connection being suitable for transmitting control commands.

Figure 4:
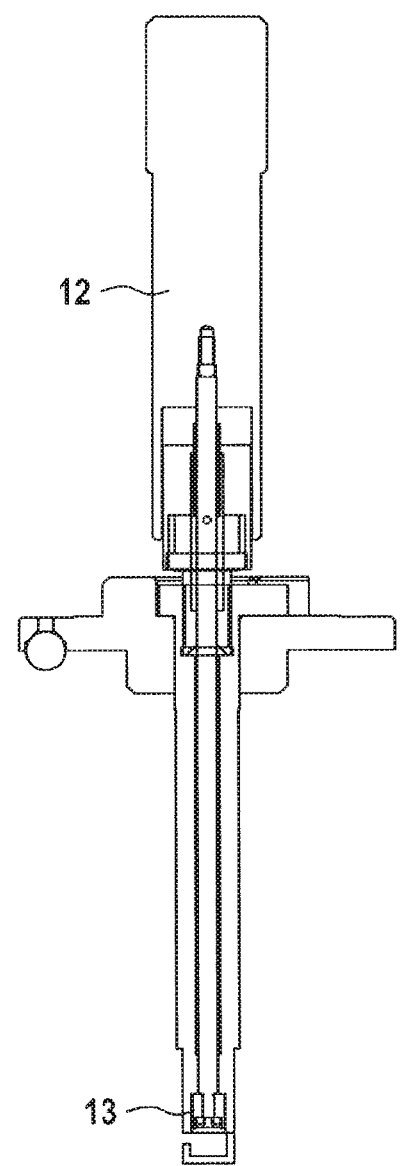
FIG. 4 shows a first exemplary embodiment of a sample manipulator with an open gripper.

The gripper (coupling structure 13) as part of the sample manipulator 12 is shown in an open state in FIG. 4.

Figure 5:
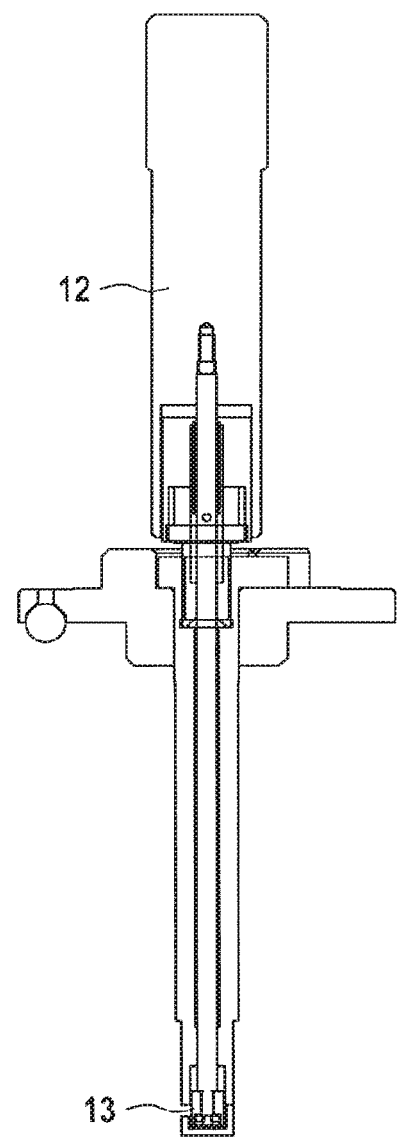
FIG. 5 shows the first exemplary embodiment of the sample manipulator with a closed gripper.

In FIG. 5, the sample manipulator 12 is illustrated with a closed gripper.

Figure 6:
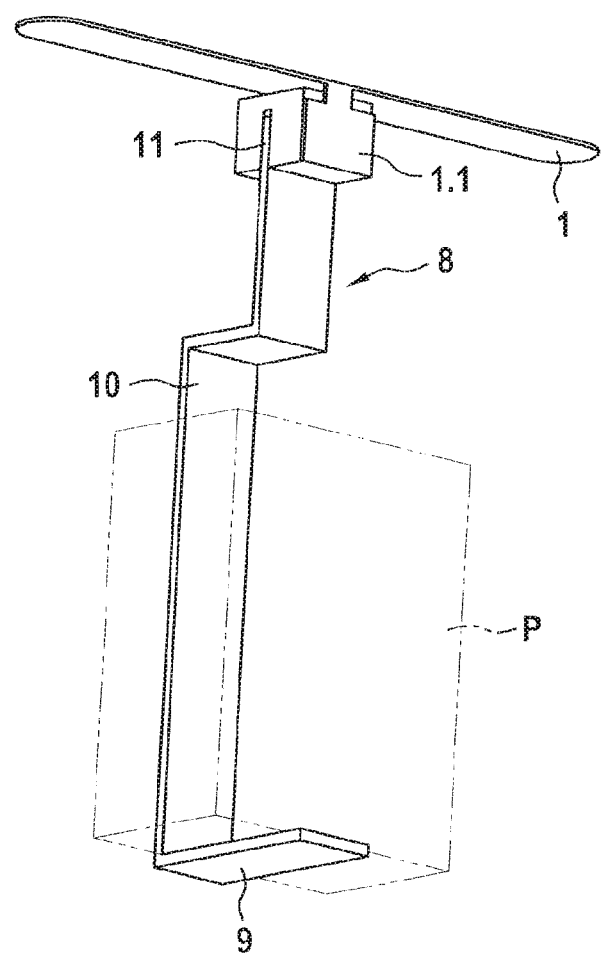
FIG. 6 shows a first exemplary embodiment of a sample holder according to the invention.

An exemplary embodiment of a sample holder 8 is illustrated in FIG. 6. The sample holder 8 holds the sample P on a sample stage 9. It comprises a coupling structure 11, which is embodied as a flat rod in this example. In different variants, the sample holder 8 can be embodied to receive various samples P. A carrier portion 10 between the sample stage 9 and coupling structure 11 is laterally connected to the sample stage 9 and embodied in an offset or angled fashion such that the center of gravity of the sample holder 8 is located below the coupling structure 11 and the sample holder 8 hangs out vertically, even with a sample P.

Figure 7:
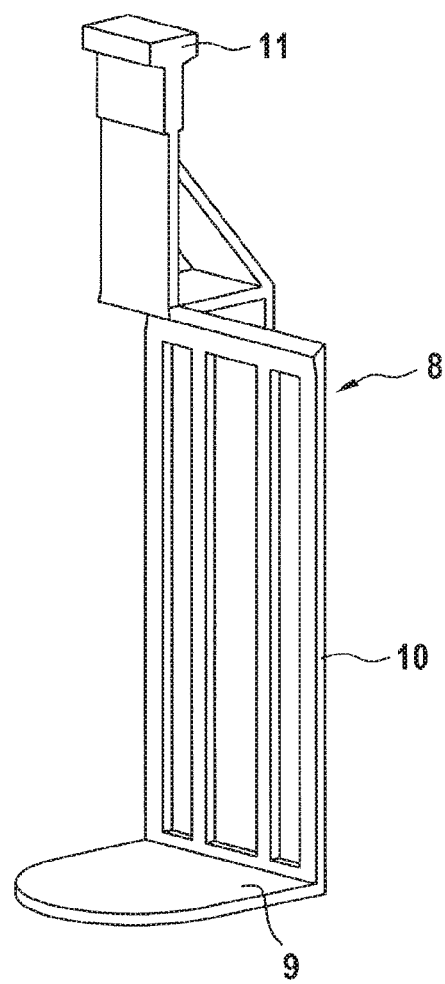
FIG. 7 shows a second exemplary embodiment of a sample holder according to the invention.

Thus, a sample holder 8 according to the further exemplary embodiment illustrated in FIG. 7 comprises a sample stage 9, a carrier portion 10 and the coupling structure 11 of the sample holder 8 situated thereon. By way of example, the coupling structure 11 is embodied in such a way that the latter fits into the first coupling point 1.1 of the adapter 1 illustrated in FIG. 1 in detachably interlocking fashion. The carrier portion 10 comprises vertically extending slots.

Figure 8:
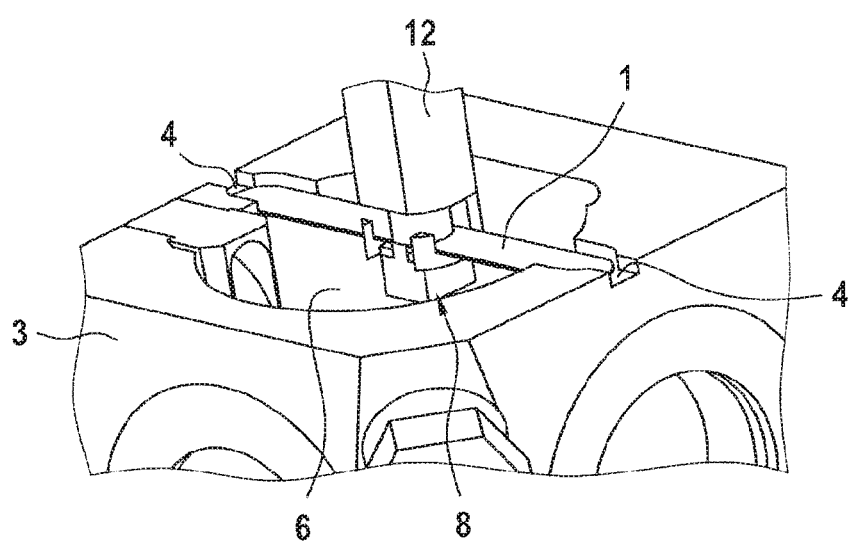
FIG. 8 shows a detailed view of an adapter in the mounted state.

FIG. 8 shows, in a magnified detailed illustration, the sample chamber 3 with an inserted sample holder 8 and a gripper of the sample manipulator 12, said gripper being in contact with the sample holder 8. The adapter 1 has been inserted into the sample holder support 4 such that the sample holder 8 is held with a defined position relative to the sample chamber 3 in the interior 6 thereof. The sample chamber 3 can be moved together with the sample holder 8, for example be inserted into a microscope 16 (see, e.g., FIGS. 10, 11) or removed therefrom, for as long as the sample manipulator 12 has not yet been connected to the second coupling point 1.2 (covered by the sample manipulator 12). In the illustrated exemplary embodiment, a part of the sample manipulator 12 situated at the second coupling point 1.2 engages around the adapter 1.

Figure 9:
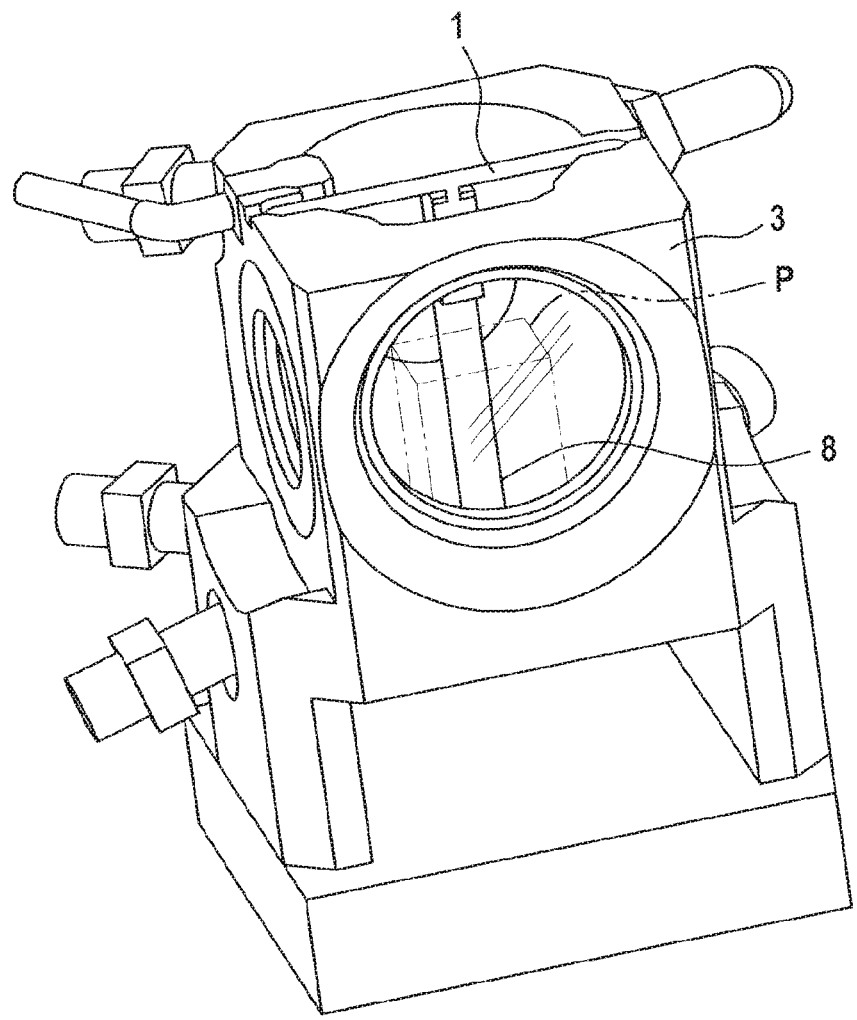
FIG. 9 shows a sample chamber according to the invention, equipped with a sample holder and a sample.

The sample chamber 3 with the inserted sample holder 8 and the sample P are shown in perspective fashion in FIG. 9.

Figure 10:
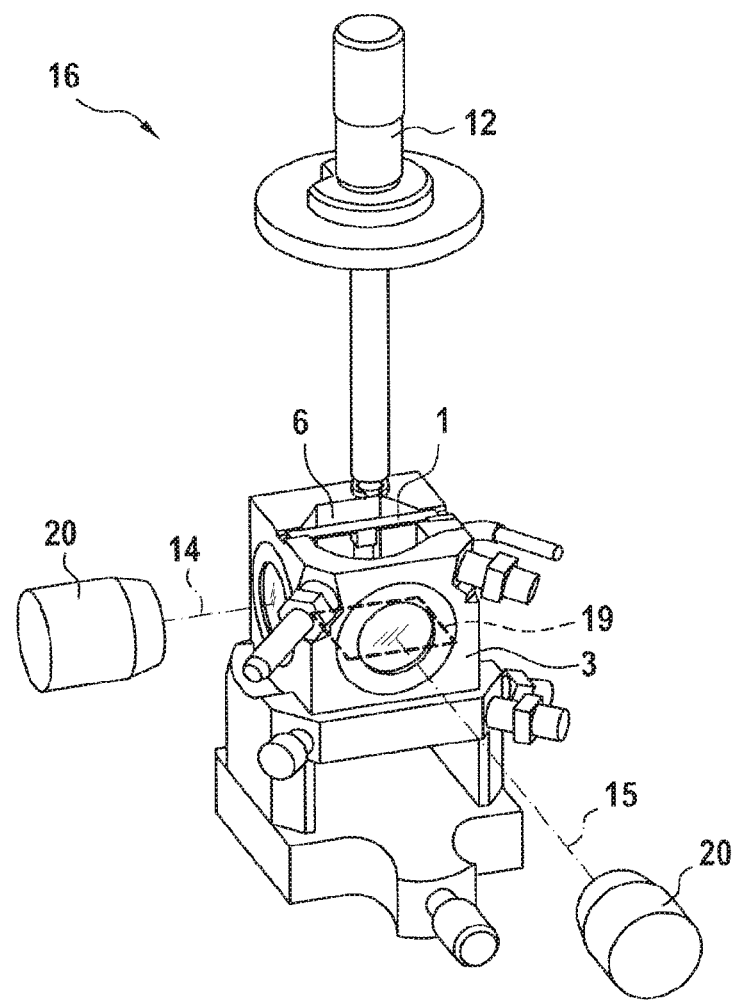
FIG. 10 shows an exemplary embodiment of a sample chamber with a sample holder, adapter and sample manipulator in a detection beam path of a microscope.

FIG. 10 shows an exemplary embodiment of a sample chamber 3 with a sample holder 8 (not shown), adapter 1 and sample manipulator 12 in a detection beam path 15 of a microscope 16. A light sheet 19 only indicated here can be generated along an illumination beam path 14 in the interior 6 of the sample chamber 3. The sample P is illuminated by the light sheet 19, in each case in one plane. Image data of the sample P are captured by means an objective 20 along the detection beam path 15.

Figure 11:
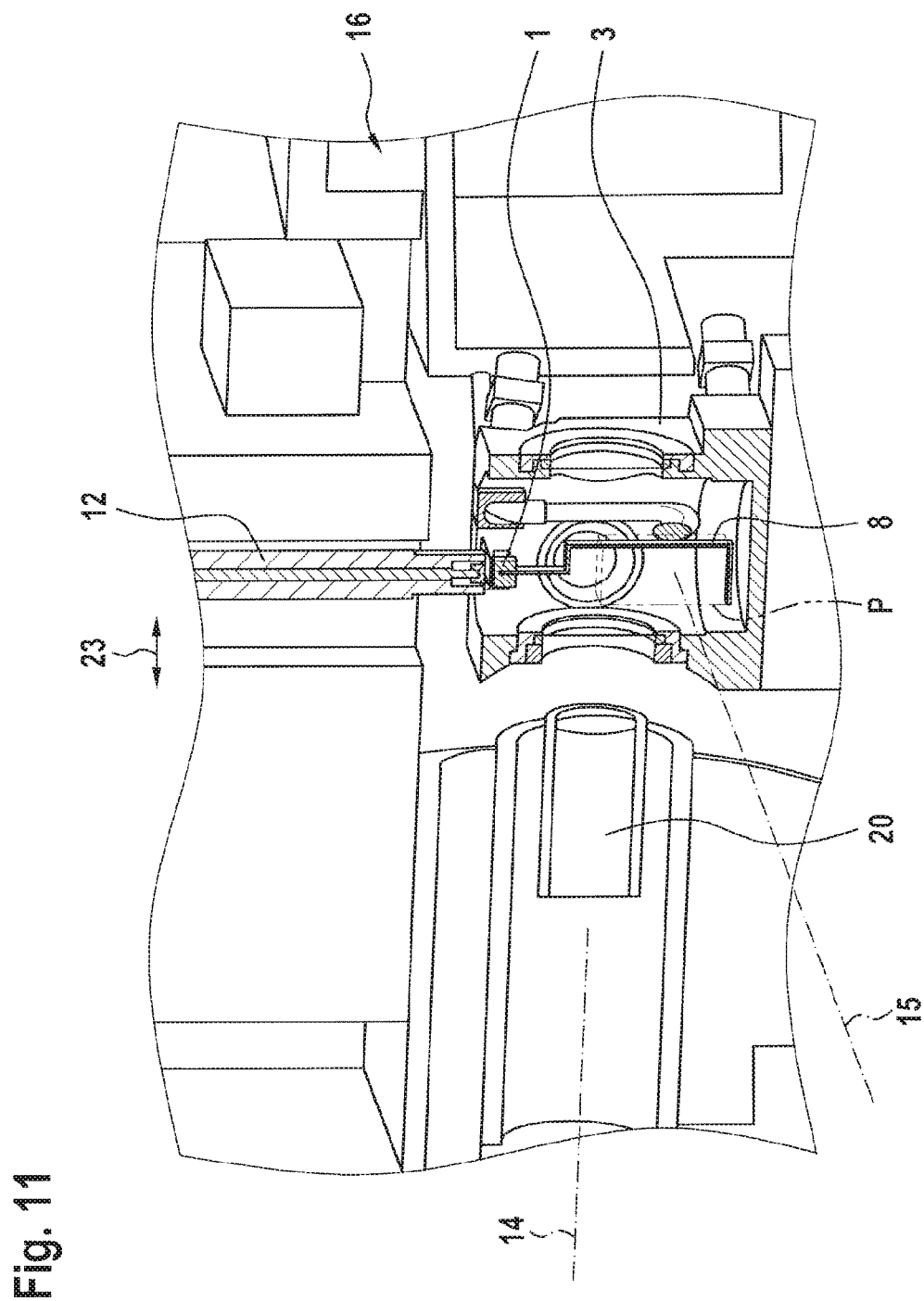
FIG. 11 shows a sectional illustration of a light sheet microscope with an inserted sample chamber and a sample manipulator in a coupling position.

FIG. 11 shows a microscope 16 with an inserted sample chamber 3, illustrated in a section. The sample holder 8 with adapter 1 and sample P were equipped outside of the microscope 16 and inserted into the microscope 16 as a unit. There, the adapter 1 is contacted by, and detachably connected to, the sample manipulator 12, which has been displaced into a coupling position 21 in controlled fashion. The sample holder 8 is shown in the work direction 23, which allows an illumination of the sample P for both objectives 20 (one of which is illustrated) of the illumination beam path 14 and an image capture along the detection beam path 15.

Figure 12:
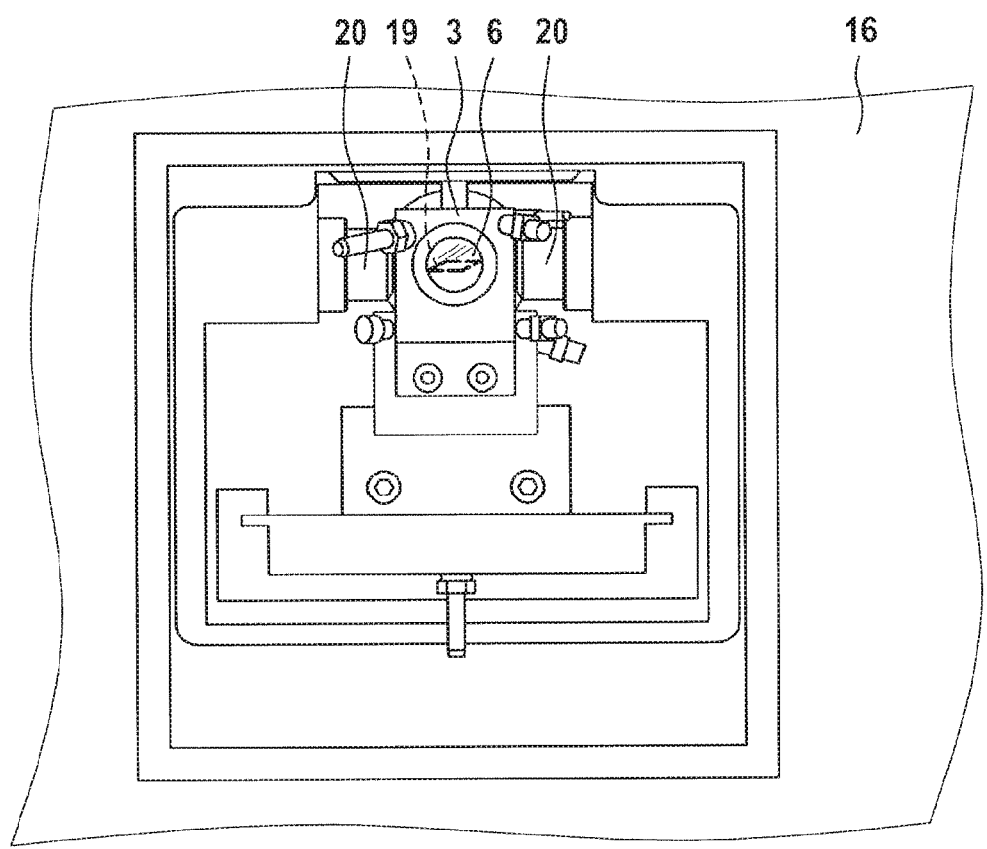
FIG. 12 shows a schematic section of a light sheet microscope with illumination objectives.
Figure 13:
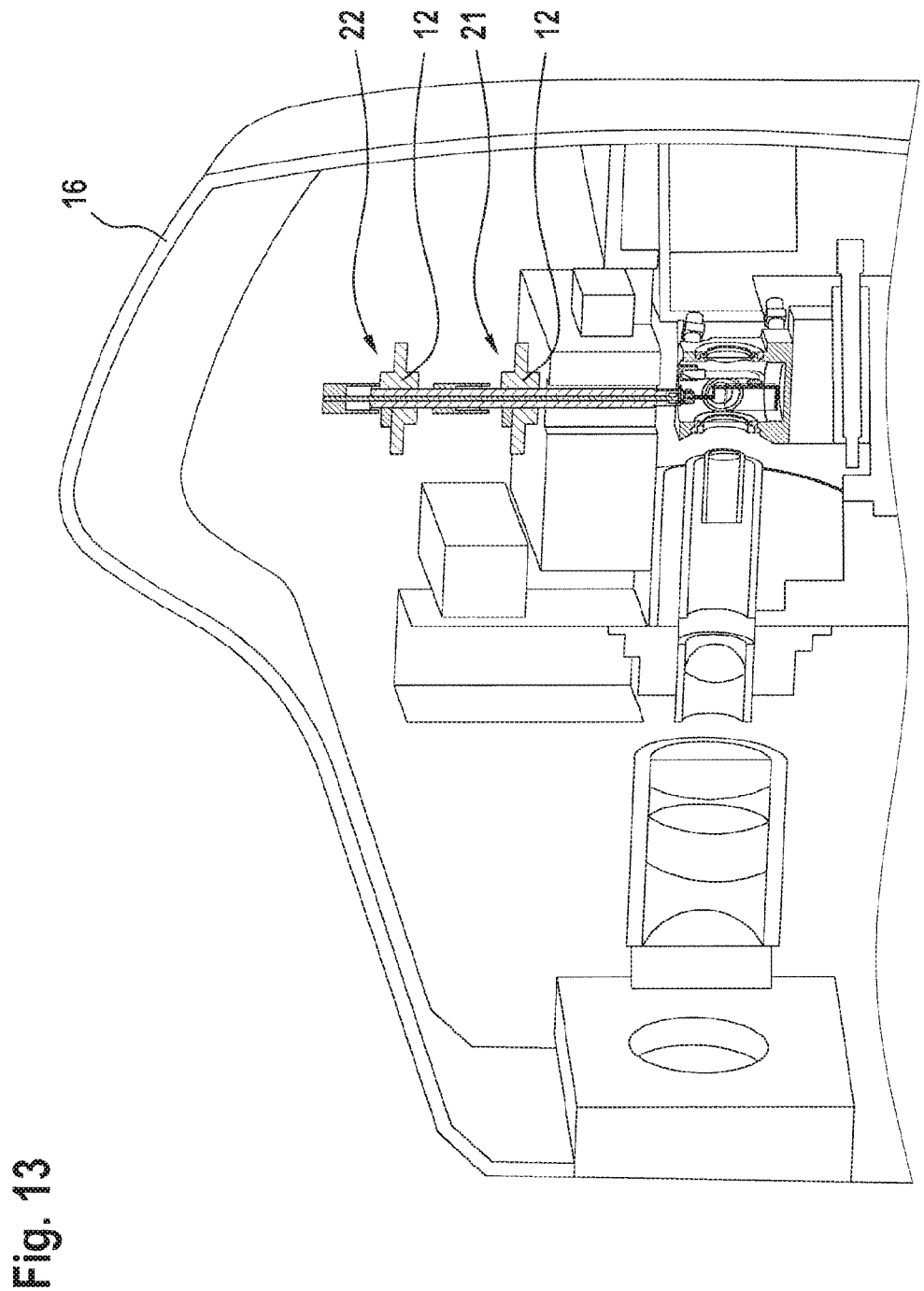
FIG. 13 shows a schematic sectional illustration of a light sheet microscope with illustrations of a coupling position and a loading position of the sample manipulator.

The sample chamber 3 and objectives 20 of the microscope 16 can be seen in FIG. 12. The objectives 20 serve to generate the light sheet 19 in the interior 6 of the sample chamber 3. A loading position 22 and the coupling position 21 of the sample manipulator 12 are shown in a further sectional illustration of the microscope 16 (FIG. 13).

Figure 14:
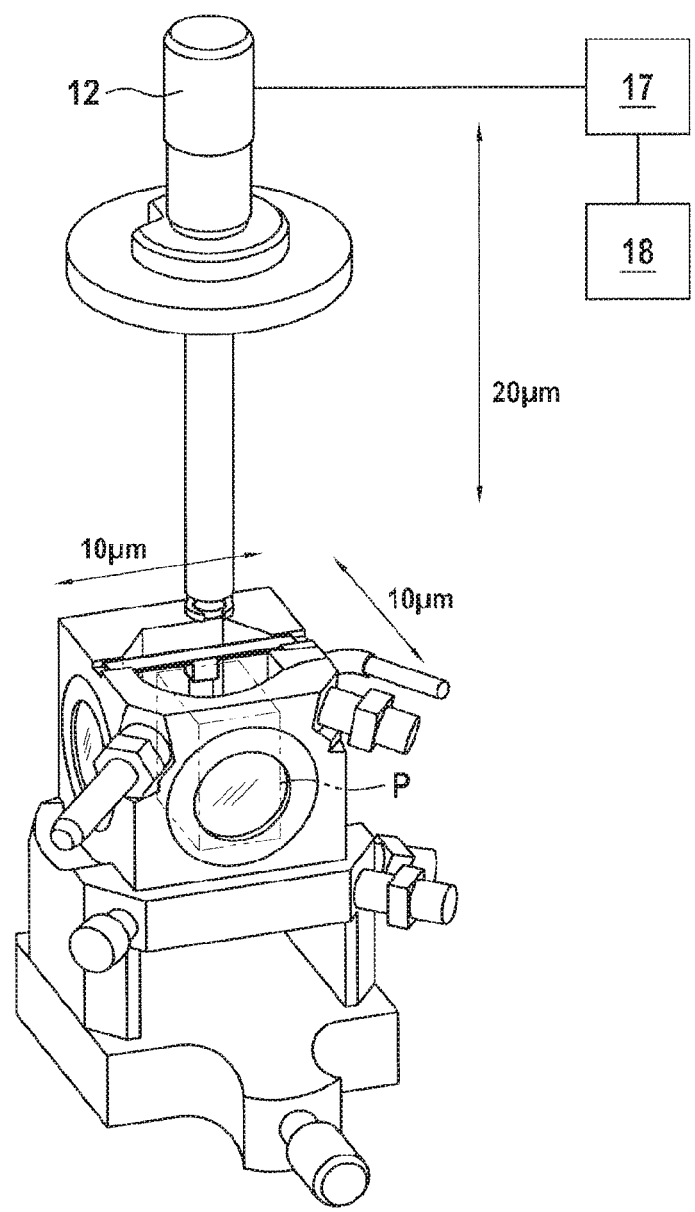
FIG. 14 shows a schematic illustration of a sample chamber with a sample holder, adapter and sample manipulator, and exemplary movement dimensions.

Exemplary dimensions of a sample P to be observed by means of the invention can be gathered from FIG. 14. The dimensions specified in exemplary fashion simultaneously specify possible distances through which a sample P is movable in controlled fashion by means of the sample manipulator 12 that has been coupled at the second coupling point 1.2. Rotations about the longitudinal axis (z-axis) are not illustrated. The movements of the sample manipulator 12 and the movements of the sample P resulting therefrom are prompted, and optionally also monitored, by the control unit 18.

REFERENCE SIGNS

1 Adapter, coupling piece
1.1 First coupling point
1.2 Second coupling point
2 Support region
3 Sample chamber
4 Sample holder support
5 Window
6 Interior
7 Port
8 Sample holder
9 Sample stage
10 Carrier portion
11 Coupling structure (of the sample holder)
12 Sample manipulator
13 Coupling structure (of the sample manipulator)
14 Illumination beam path
15 Detection beam path
16 Microscope
17 Drive
18 Control unit
19 Light sheet
20 Objective
21 Coupling position
22 Loading position
23 Work direction
P Sample

The invention claimed is:

1. An adapter for a sample holder of a microscope, the adapter comprising:
   at least one support region for reproducibly orienting the adapter in a mounted state in a sample holder support,
   a first coupling point for detachable connection to a coupler of a sample holder on one side of the adapter and
   a second coupling point for detachable connection to a coupling area of a sample manipulator on a side of the adapter opposite to the first coupling point, wherein the at least one support region is above the sample holder in the mounted state and wherein the coupler is above a carrier portion of the sample holder.

2. A sample holder for receiving and holding a sample to be observed, the sample holder comprising:
   a section configured to hold a sample; and
   a coupler configured to couple the sample holder to a first coupling point of an adapter, which comprises at least one support region for reproducibly orienting the adapter in a mounted state in a sample holder support, the first coupling point for detachable connection to the coupler of the sample holder on one side of the adapter, and a second coupling point for detachable connection to a coupling area of a sample manipulator on a side of the adapter opposite to the first coupling point,
   wherein the section configured to hold the sample comprises a sample stage or sample cage, wherein the section configured to hold the sample is below the adapter, and wherein the coupler facilitates a detachable connection of the sample holder to the adapter by the coupler and the first coupling point.

3. The sample holder as claimed in claim 2, comprising the adapter connected by the coupler and the first coupling point.

4. The sample holder of claim 3, wherein the first coupling point is a dovetail guide.

5. The sample holder of claim 2, wherein the section comprises a carrier portion.

6. The sample holder of claim 5, wherein the carrier portion is fastened to only one side of the sample stage, and wherein the sample holder comprises no barrier to observation on any other side of the sample stage.

7. The sample holder of claim 5, wherein the carrier portion comprises at least one aperture.

8. The sample holder of claim 5, wherein the sample stage or sample cage is configured to support the sample having a width of more than 5 mm.

9. A sample chamber for a microscope, comprising:
a sample holder support, and
an adapter comprising:
at least one support region for reproducibly orienting the adapter in a mounted state in the sample holder support,
a first coupling point for detachable connection to a coupler of a sample holder on one side of the adapter, and
a second coupling point for detachable connection to a coupling area of a sample manipulator on a side of the adapter opposite to the first coupling point, wherein the at least one support region is above the sample holder in the mounted state and wherein the coupler is above a carrier portion of the sample holder.

10. A microscope, comprising:
the sample chamber as claimed in claim 9.

11. The microscope of claim 10, wherein the microscope is a light sheet microscope.

12. The microscope of claim 11, configured to receive a sample having a width of more than 5 mm.

13. A method for arranging a sample in a detection beam path of a microscope, the method comprising:
providing the sample chamber as claimed in claim 9,
inserting a sample to be observed, which is held on a sample holder, into an interior of the sample chamber, wherein the sample holder comprises a coupler connected to a first coupling point of the adapter and the adapter with the at least one support region, is detachably mounted in the sample holder support of the sample chamber with predefined positioning,
connecting the adapter to a sample manipulator by a second coupling point of the adapter and a coupler of the sample manipulator, and
moving the sample holder with the sample manipulator in the detection beam path of the microscope.

14. The method of claim 13, wherein the microscope is a light sheet microscope, and wherein the sample has a width of more than 5 mm.

* * * * *